United States Patent [19]

Dias et al.

[11] Patent Number: 4,679,190
[45] Date of Patent: Jul. 7, 1987

[54] DISTRIBUTED VOICE-DATA SWITCHING ON MULTI-STAGE INTERCONNECTION NETWORKS

[75] Inventors: Daniel M. Dias, Mahopac; Manoj Kumar, Crompond; Yeong-Chang L. Lien, Briarcliff Manor; Kiyoshi Maruyama, Chappaqua, all of N.Y.

[73] Assignee: International Business Machines Corporation, Armonk, N.Y.

[21] Appl. No.: 856,321

[22] Filed: Apr. 28, 1986

[51] Int. Cl.[4] ................................ H01Q 11/04
[52] U.S. Cl. ........................ 370/60; 340/825.5
[58] Field of Search ............. 370/60, 94; 340/825.5, 340/825.51, 825.79, 825.8

[56] References Cited

U.S. PATENT DOCUMENTS

| Re. 31,182 | 3/1983 | Crager et al. | 370/60 |
| 3,428,946 | 2/1969 | Batcher | 370/60 |
| 4,627,048 | 2/1986 | Larson | 370/60 |

FOREIGN PATENT DOCUMENTS

0232743  11/1985  Japan ..................... 370/60

Primary Examiner—Douglas W. Olms
Attorney, Agent, or Firm—Douglas W. Cameron

[57] ABSTRACT

A method of switching synchronous and asynchronous data packets through a multi-stage interconnection network (MIN), so as to insure that packets with the highest assignable priority level will never be blocked at any stage of the network. More specifically, this invention relates to a method of switching voice and data packets over the MIN wherein each of the address bits in each packet determine the connection to be established at each particular stage in the network and wherein each packet has therein a priority level. In each time slot of a frame, the priority level of the packets stored in a particular originating adapter are compared and the packet with the highest priority level in each adapter is forwarded through the MIN and routed through the MIN as described above. Also, at each subswitch at each stage of the MIN, if two or more packets request the same subswitch output, only the packet with the higher priority is forwarded to the subswitch output. A packet will be assigned the highest priority only if a corresponding packet for a given circuit connection with second highest priority level was successfully transmitted through the MIN.

13 Claims, 10 Drawing Figures

ESTABLISHED CALL REQUEST PACKET

CALL SET UP REQUEST PACKET

ASYNCHRONOUS DATA REQUEST PACKET

DISTRIBUTED VOICE-DATA SWITCHING ON MULTI-STAGE INTERCONNECTION NETWORKS

TECHNICAL FIELD

This invention relates generally to a method of switching integrated voice/data over a multi-stage interconnection network (MIN). More particularly, this invention relates to a method of switching voice and data packets over the MIN with distributed control, wherein each of the address bits in each packet determines the connection to be established at a particular stage of the network and wherein each packet has therein a set of bits to indicate a priority level. The protocol for switching packets of different priority levels insures that no packet will interfere with sending a packet with the highest priority level. Thus, voice can be circuit switched by assigning it the highest priority level.

BACKGROUND OF THE INVENTION

As the transmission of data becomes more and more popular in our industrialized society, there is a need to transmit, and hence switch, both voice and data traffic over the same network facility.

Many methods of integrally switching both voice and data are known, however, these methods can cause bottlenecking of a controller, which are of a limited fixed bandwidth and relatively expensive to grow.

The switching network commonly used for high bandwidth switching is the crossbar switch where crosspoints are set by a centralized controller. This centralized control of the crosspoints can result in bottlenecking of the controller, especially at high switching rates. For example, in a typical case, 100 Mbps serial transmission of data and voice frequency on a 128×128 crossbar switch, approximately 16,000 crosspoints would have to be set up in about 3 usec. In addition, such a centralized controller would have to store the settings for each slot in a frame requiring a very fast and large memory. To further bottleneck the central controller, the well known switching systems use the controller to assign time slots. More specifically, U.S. Pat. No. 4,445,213 to Baugh et al handles both voice and data, however, a fixed number of time slots for voice or synchronous data are assigned by a centralized controller.

The most relevant art for integrated voice data switching is directed to controlling switching data or voice on a digital loop of a fixed maximum bandwidth. This art supports data in the order of tens of megabits per second. More specifically, U.S. Pat. Nos. 4,445,213 to Baugh et al and 4,251,880 to Baugh et al provide for the integrated transmission of both voice (synchronous data) and data (asynchronous data) between interchangers interconnected by a digital loop of fixed maximum bandwidth. The above cited patents support data rates up to in the order of several megabits per second.

With crossbar switches the number of crosspoint switches grows as the square of the number of input ports. Thus, a 128×128 crossbar switch requires (128$^2$) or 26,384 crosspoint switches. Thus, making large crossbar switches can be very expensive.

Packet switched MINs have been proposed and studied primarily for connecting processors and memories in multi-processor computer systems. These networks use distributed control and can be grown by adding extra stages. However, with the protocols proposed previously, packets have variable delay in passing through the network. This causes clipping due to loss of packets if they are used to switch synchronous traffic such as voice. To obtain small clipping, the networks must be operated at very small load levels so as to reduce the variance of packet delays. Further, it has been shown that if non-uniform traffic occurs in such networks causing hot-spots, network throughput falls drastically, and delays become very large. Such dynamic phenomena would cause unacceptable clipping of synchronous traffic.

There is, therefore, a need to provide a method of integrally switching voice and data with a high bandwidth, reduced clipping, distributed control and inexpensive growth potential.

SUMMARY OF THE INVENTION

The present invention provides a method of switching voice circuit and data packets through a multistage interconnection switching network. With this invention, circuit switching and packet switching are simultaneously supported on the multistage interconnection switching network (MIN) with distributed control, thereby avoiding bottlenecking of controllers. A variable bandwidth that grows with the number of input ports is also provided with this invention. In addition, the method of this invention facilitates growth whereby the number of subswitches grow as $N \log_x N$, where $N$ is the number of input port adapters and $X$ is the number of outputs per subswitch. Most importantly, this invention insures that voice circuit packets will not be blocked at any stage of the multistage interconnection network. Thus, clipping is eliminated since no voice samples are lost.

Accordingly, it is an object of this invention to insure that a packet with the highest priority level will arrive at its destination in the same corresponding time slots of a sequence of frames during a circuit connection. That is, an object of this invention is to insure that packets of the highest priority level will be synchronously transmitted without clipping through the MIN. The method of this invention satisfies this objective by insuring that no packet with the highest priority level will be blocked at any stage of the MIN.

Accordingly, the present invention relates to a method of switching packets through a multistage interconnection network. The first step of this method is to assign a packet for a given circuit connection with the highest assignable priority level only after a corresponding packet with the second highest assignable priority level was successfully transmitted through the switching network.

Packets at the inputs of each subswitch of the first stage of the switching network are then transmitted to corresponding outputs of the same corresponding subswitch. These outputs are indicated by a respective address bit in the respective packets. If two packets at inputs to the same subswitch request the same output, then the packet with the highest priority level is transmitted to that output. If the packets requesting the same output are of the same priority level, then any one of the packets is chosen for transmission to that output. The outputs above are connected to inputs of subswitches of the second stage and so on until the outputs of the subswitches of the next to last stage are connected to the inputs of the last stage of the interconnection network.

The above process of transmitting packets from the inputs of subswitches to the output of the subswitches is repeated for each stage of the network until the packets are finally received at the outputs of the last stage of the interconnection network. The particular output of each subswitch is indicated by a corresponding address bit in each respective packet.

DESCRIPTION OF THE PREFERRED EMBODIMENT

Figure 1:
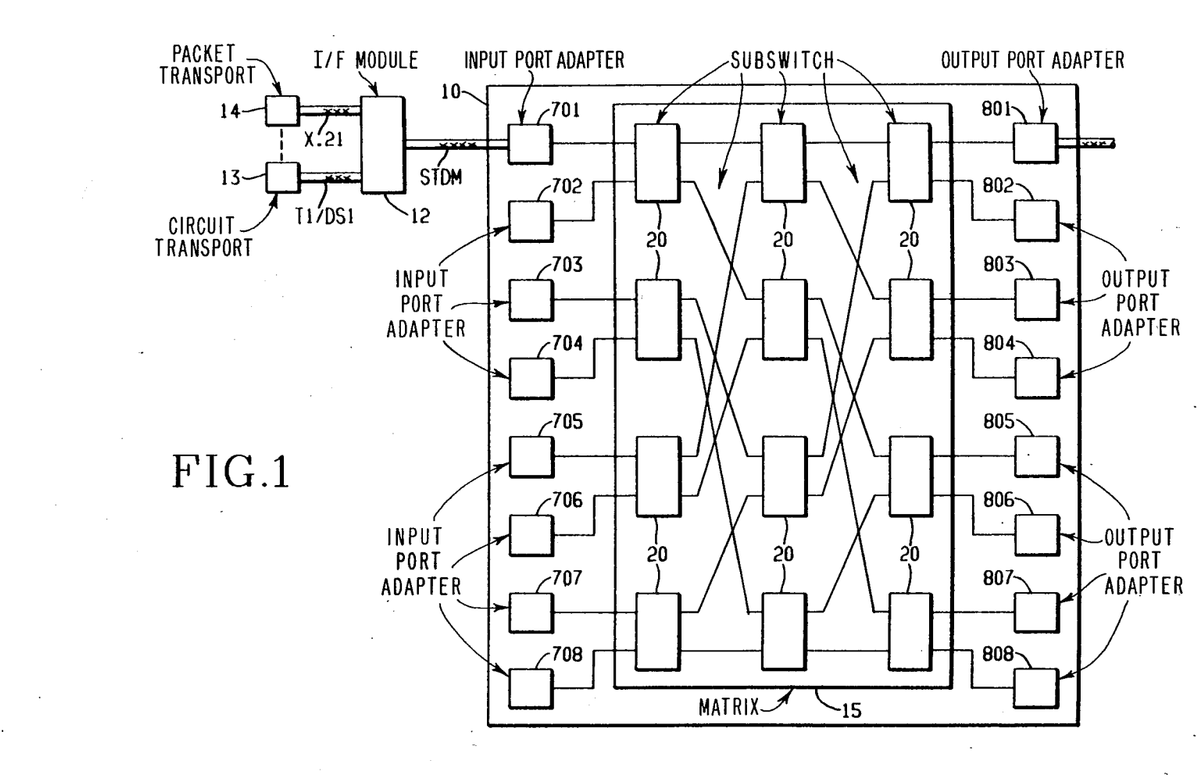
FIG. 1 is a schematic of the overall apparatus used in this invention. More specifically, a multi-stage interconnection network is shown with connections to circuit and packet devices.

FIG. 1 shows a block diagram of the multi-stage interconnection switching network 10 that embodies this invention. The switching network is intended to be used in the implementation of a telecommunication network that is comprised of clear channel circuit switching and packet data switching. Communication devices interface with the switching network through InterFace modules (I/F Module) 12 which generate packet streams in statistical time division multiplexed formats. An I/F Module supports circuit transport 13 and packet transport devices 14 which use different user interfaces. An example of circuit transport interface is the generic T1/DS1 with D4 format and an example of packet transport interface is the X. 21 or RS232C physical link supporting X.25 protocol. Although an ISDN interface is not necessarily implemented, an I/F Module could be open ended to permit expansion to service users of ISDN attaching devices.

The switching network has a plurality of input port adapters 701-708. Each I/F module 12 is connected to an input adapter. In turn, each input port adapter is connected to a switching matrix 15 composed of multiple stages of subswitches 20. Finally, the last stage of the switching matrix is connected to output port adapters 801-808. In the following description four subswitches in each stage (see FIG. 2) of a three stage multi-stage interconnection switching network 10 will be considered, and an interconnection pattern using the shuffle-exchange pattern will be assumed. However, those skilled in the art will appreciate that the present invention can be readily adapted for use with n-input m-output switches, and other interconnection patterns (as in the class of Delta networks). These components of the network are now described.

The basic scheme of this invention provides a number of circuit switched connections between port adapters 701-709 and 801-809. These connections are set up by a distributed algorithm. The multistage interconnection switching network is operated in frames composed of a number of slots (see 75 of FIG. 7). At a port adapter, a used slot will correspond to an established circuit switched connection; unused slots are available for new circuits. Frames and slots are described in more detail below in the description of FIG. 7. In each slot each port may make a request to pass a packet (i.e., a slot worth of data) to some other port. The protocol will ensure that requests corresponding to established circuits will never be blocked though the shuffle-exchange network is blocking.

The call requests in a slot will be of two types: a call set-up request and an established call request. The established call requests and the call set up requests are in the form of a packet with a specific priority level indicating the type of request. These packets are described below in the description of FIG. 6. The established call request will have priority level 00 (high priority) while the call set-up request will have priority level 01 (low priority). The switching network will be operated in synchronous mode so that all port adapters will make call requests simultaneously. As in the normal routing in shuffle-exchange networks, each request will carry an output port adapter address. In addition, the request will contain its priority.

At each stage in the switching network, one bit of an output port address is used to route the packet to the correct switch output. If two requests require routing to the same output of a switch, a conflict is said to occur. The protocol (described below) will ensure that any two priority level 00 requests will never conflict. If a priority level 00 and a priority level 01 request conflict, the priority level 00 request will be accepted and forwarded to the next stage of the switching network. If two priority level 01 packets conflict, on of the will be randomly chosen and forwarded while the other will be rejected. A request that passes successfully to the requested output port will be acknowledged.

If a call set-up request (priority level 01) gets acknowledged, the originating port adapter will be implicitly allocated that path through the network for the same slot in each frame until a voice terminate packet is received (described below). When this happens, another requesting port may grab a link on the (previously) allocated path, thus providing an implicit call break-down protocol. Once a port adapter has been allocated a slot, it will send priority level 00 requests (i.e., established call requests) in corresponding slots in subsequent frames until the call is terminated. The call is terminated with a request in the form of a voice terminate packet. This packet is usually recognized as the packet with the lowest priority level such as 11, for example. Since a call is set up only if it does not conflict with existing calls, it is guaranteed that any established call will never conflict with any other established call and thus will never be blocked subsequently.

Each port adapter will maintain a list of slots that have been (implicitly) allocated to it. For each allocated slot, the port adapter will send the established call request and call information. To set up a new connection, the port adapter will scan the list of unallocated slots and for each such slot it will send out a call set-up (priority 1) request, until either it is allocated a slot (i.e., gets a positive acknowledge from an output port or all slots are exhausted. In the latter case, the call request is said to be blocked. The call blocking probability is estimated below for the case of a voice environment. It will be assumed below that blocked calls are rejected (given a busy signal). This rejection, however, is not necessary since blocked calls may be retired in subsequent frames when no other call requests are outstanding.

The term "highest priority level" in this embodiment refers to the priority level 00. More generally, it refers, as the term implies, to the level that indicates the highest priority.

Figure 2:
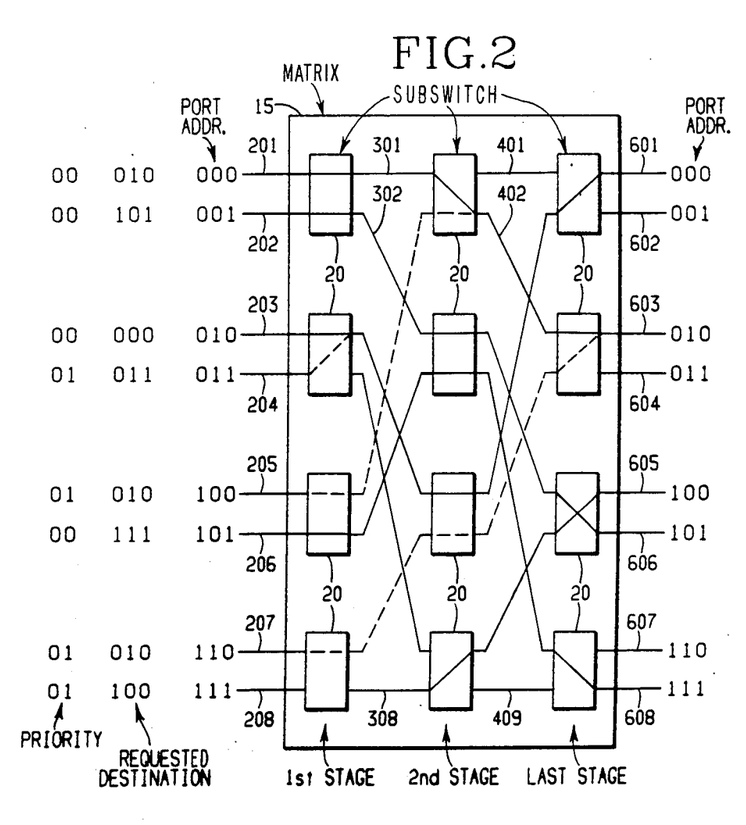
FIG. 2 is a schematic of the switching matrix of the multi-stage interconnection network. The matrix shown is for a shuffle exchange network.

Shown in FIG. 2 is a schematic of the switching matrix 15 of the multistage interconnection network (MIN) 10. Also shown in FIG. 2, are four subswitches 20 in each stage of the MIN. Each subswitch 20 serves to connect one or both of its two outputs (301 and 302), with only one input being connected to only one output. The outputs of the subswitches of the first stage are connected to corresponding inputs of subswitches of the second stage of the switching matrix. The outputs of subswitches of the second stage (401 and 402, for example) are connected to corresponding inputs (501 and 503, for example) of the subswitches of the third and last stage.

The pairs of bits in the column on the extreme left of FIG. 2 represent the priority level (see 64, 65, and 66 of FIG. 6) of the packet requesting service. The sets of three bits in the next column represent the address bits (see 67, 68 and 69 of FIG. 6), with each set representing the address of a particular terminating port adapter (also referred to as an output adapter). This output port adapter could also be said to refer to a particular output (see 601 of FIG. 2, for example) in the last stage of the switching network since this output is connected to only one output port adapter.

Each bit of the above set of three bits also represents a particular output of a particular subswitch at a corresponding stage of the switching matrix. For example, the address bits 010 at the originating adapter 701 (also referred to as an input adapter), represent a request for connection to a terminating adapter 803 (see FIG. 1 or to output 603 (see FIG. 2) of third stage of the switching matrix. Also starting from the right and again using the address bits 010, 0 represents the top output 301 of the subswitch to which originating adapter 701 is connected. The latter adapter is represented by the port address 000. The second bit 1 of the address bits represents the bottom output 402 of a respective subswitch 20 of the second stage of the network. Finally, the last bit 0 of the address bits 010 represents the top output 603 of a respective subswitch 20 to which output 402 is connected. The output 603 is connected to terminating adapter 803 which is represented by the address bits 010.

Figure 3:
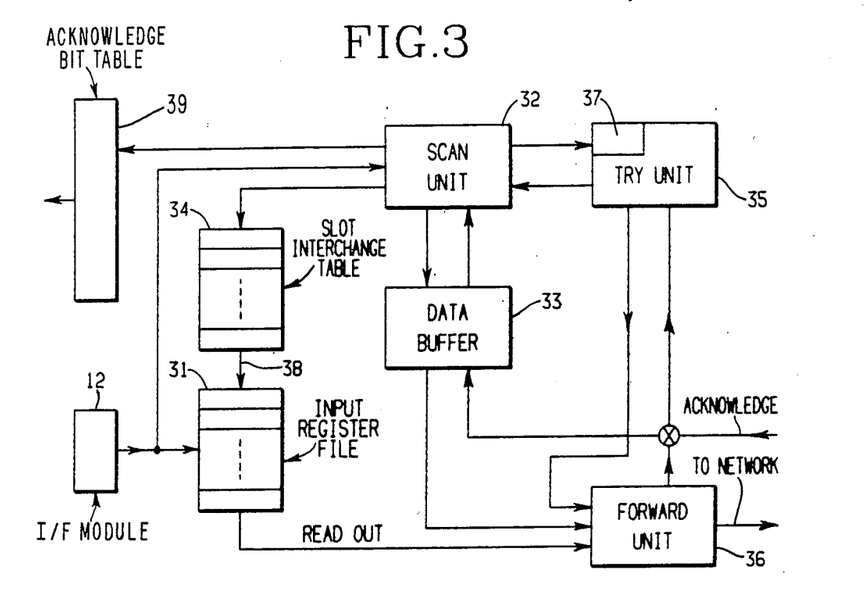
FIG. 3 is a schematic of the originating adapters.

A block diagram of an output port adapter is shown in FIG. 3. The output port adapter consists of the following sub-units: input register file 31, scan unit 32, data buffer 33, slot interchange table 34, try unit 35 and forward unit 36. These sub-units of this output port adapter perform the following functions as described below.

Input Register File 31

Figure 6:
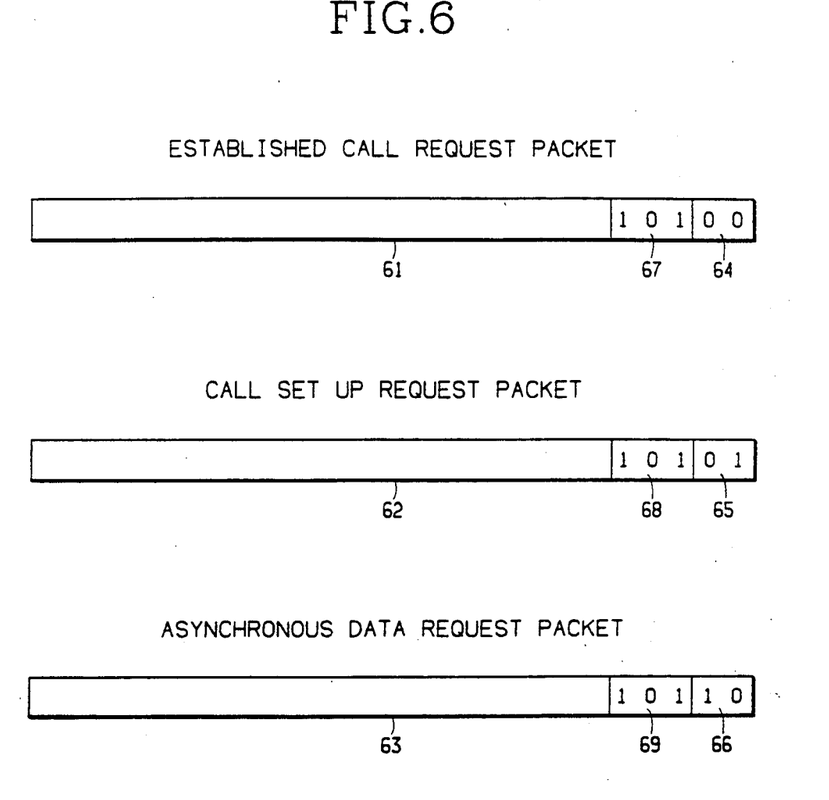
FIG. 6 shows a schematic representation of established call request, call set up request and asynchronous data request packets.
Figure 7:
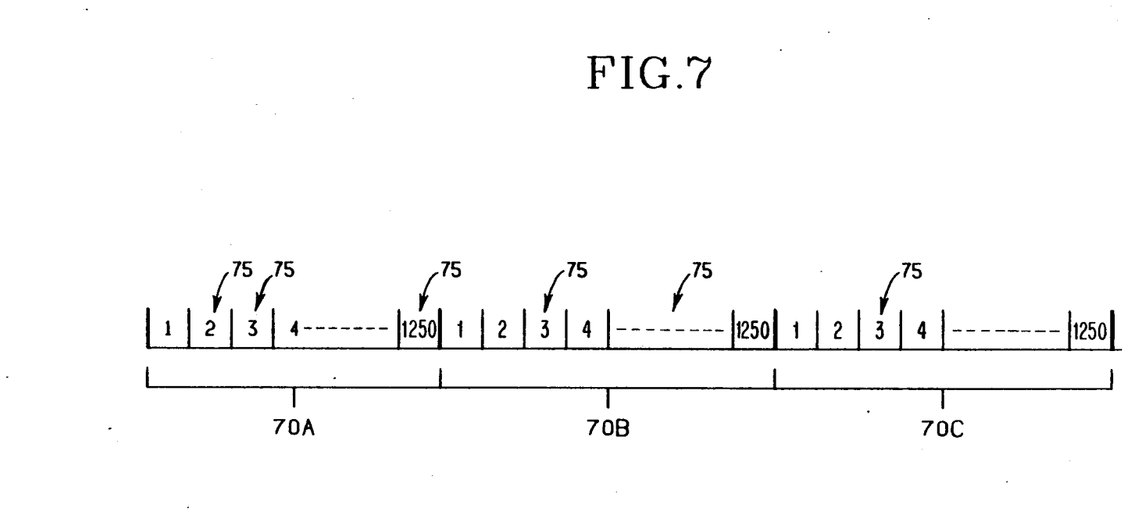
FIG. 7 is a schematic representation of a frame and slots therein.

The input register file 31 contains as many registers as the number of slots (see 75 of FIG. 7) in the frame (see 70 of FIG. 7). In each slot it captures the packet (see 61-63 of FIG. 6) on the I/F module 12, if there is one present, and stores this packet in the corresponding register. For example, a packet captured in slot 5 is stored in register 5. Note that in some slots there may be no packet on the I/F module. In this case, the corresponding register in the input register file 31 is cleared.

The input register file supports a read from any register and a write to any register in one clock cycle. If the read and write locations are the same then the old contents of the register are read out and then replaced by the new contents being written in. The address of the location to be read out is obtained from the scan bus 32. Note that in some slots there may be no valid address on the scan bus. The contents read out from the input register file 31 are presented to the forward unit 36.

Data Buffer 33

The data buffer receives asynchronous data packets (see 63 of FIG. 6) from the scan unit 32 in each of the slots in which the scan unit receives a data packet from the I/F module 12; the data buffer stores this packet, provided that the data buffer is not full. Furthermore, in each slot the data buffer presents a data packet to the forward unit 36, if the data buffer is not empty. Towards the end of the slot the data buffer receives an acknowledgement from the forward unit if the data packet is successfully transmitted over the network 10. Upon receiving this acknowledgement, the data buffer deletes the currently transmitted packet from it storage. If no acknowledgement is received, the currently transmitted packet is retained in the data buffer storage.

Scan Unit 32

In each slot the packet from the I/F module 12 is captured by the scan unit (and also by the input register file 31). If the input interface contains no valid packet in the current slot, the acknowledge bit (as explained below) and the register in the slot interchange table designated for this slot, are reset. If the packet received is an established call request packet 62 (a packet with the highest priority level), no action is taken by the scan unit 32. If the packet received by the scan unit is an asynchronous data packet 63 and the data buffer 33 has free space to store this packet, the packet is stored in the data buffer and the acknowledge bit designated for the current slot is set to 1. If the data buffer is full when the scan unit receives the asynchronous data packet, the designated acknowledge bit is set to 0.

If the scan unit receives a voice circuit terminate packet, once again the acknowledge bit designated for the current slot is set to 0 and the entry in the register of the slot interchange table 34 designated for this slot is cleared.

For call set up request packets 62 received by the scan unit, the packet is forwarded to the try unit 35 along with the number of the slot in which this packet was received, and the acknowledge bit designated for this slot is set to 1.

The scan unit also receives messages from the try unit 35 indicating if a circuit connection has been established corresponding to a call setup request, or indicating that such a circuit connection cannot be established. For circuit connections that are established, the message contains the slot number in which the request arrived on the I/F module 12 (in-slot number) and the slot in which the circuit connection was established (out-slot number). On receiving this message, the scan unit 32 enters the out-slot number in the location in-slot of the slot interchange table 34. If the request cannot be satisfied, the scan unit resets the acknowledge bit corresponding to the in-slot number in the acknowledge bit table (see 39 of FIG. 3).

Acknowledge Bits

The acknowledge bits are used by the port adapter to signal the I/F module about the receipt of data packets and to acknowledge that a circuit connection has been established in response to a call set-up request. The acknowledge bits are set by the scan unit 32. In each slot, if a data packet is received by the scan unit, the acknowledge bit corresponding to this slot is set to 1 if the data buffer 33 has the free space to hold this packet. Otherwise, the acknowledge bit is set to 0. For asynchronous data packets the designated acknowledge bit is modified in the same slot in which the asynchronous data packet is received.

For call set-up request packets the designated acknowledge bit is set to 1 when the request is received. It is reset to 0 either when the scan unit receives a message from the try unit indicating that the request cannot be satisfied or when the scan unit encounters a voice terminate packet, or no packet is received in the I/F module in the designated slot.

Slot Interchange Table 34

The slot interchange table is a register file containing as many registers as the number of slots in a frame. The registers in this table are set or reset by the scan unit as described earlier. One register can be set and another reset in the same slot. In each slot (e.g., slot 5), the contents of the register corresponding to the slot (register 5 in the slot interchange table for the example) are forwarded to the input register file 31 on the scan bus 38. The input register file uses this address to select the entry to be read out and sent to the forward unit 36.

Forward Unit 36

The forward unit 36 can receive packets from three different sources in each slot: the input register file 31, the try unit 35 and the data buffer unit 33. Fixed priority is assigned to these inputs. The highest priority is assigned to the input register file, and the lowest priority to the data buffer. In any slot, each of the three inputs may or may not have a packet.

The forward unit selects the highest priority packet arriving at its input and forwards it to the subswitch (for example see 20 of FIG. 2) in the first stage of the network, connected to this port adapter. The forward unit also receives an acknowledge from the network indicating whether the packet was successfully transmitted over the network without being blocked. A positive acknowledgement indicates successful transmission while a negative acknowledgement indicates a blockage. In the case of established call request packets, the protocol ensures that the acknowledgement is always positive, but for asynchronous data packets and call set-up request packets the acknowledgement can be either positive or negative. If the packet selected by the forward unit is an asynchronous data packet or a call set-up request packet, then the acknowledgement received by the forward unit from the network is sent to the data buffer or the try unit respectively.

Try Unit 35

The try unit receives call set-up request packets from the scan unit 32. Along with this packet it receives the number of the slot (in-slot) in which the packet arrived on the I/F module 12. The packet along with this information is stored in the pending request queue 37. In each slot, the try unit forwards the packet at the head of the pending queue 37 to the forward unit. If this packet is successfully transmitted over the network, a positive acknowledgement is received by the try unit from the forward unit. Upon receiving the positive acknowledgement, the try unit deletes the packet from the head of the pending queue 35 and sends a message to the scan unit indicating that the voice circuit has been established. This message consists of two parts: the slot in which the circuit was established (out-slot) and the slot in which the request arrived on the I/F module (in-slot). If the packet at the head of the pending queue cannot be transmitted in the current slot due to a collision in the network or because the slot is in use by an established call circuit connection originating from the same port adapter, a negative acknowledgement is received by the try unit. In this case, the packet at the head of the pending queue is retained and its transmission is attempted in the next slot. Such retries are attempted as many times as there are slots in the frame or until a successful transmission occurs. If all these retries fail then a message is sent to the scan unit indicating non-availability of the desired circuit. This message contains the number of slots in which the request arrived on the input interface (in-slot).

For circuit set-up requests that are successful, the number of the slots between the in-slot and out-slot indicate the time spent by the established call request packets in the input register file. This delay can be controlled (and traded off with blocking probability) by restricting the number of retries allowed for each packet in the try pending queue.

Figure 4:
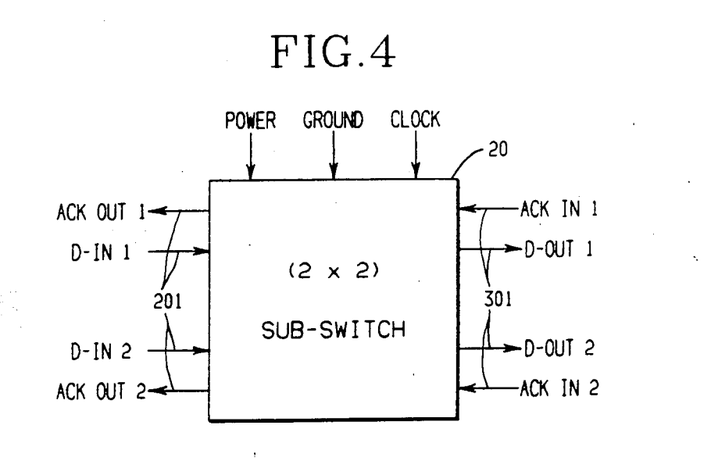
FIG. 4 is a schematic of a subswitch used in a shuffle exchange network.

Referring to FIG. 4, there is shown a 2×2 sub-switch 20. Those skilled in the art will appreciate that this is easily adapted to larger sub-switches. Hereafter, the 2×2 sub-switches will be referred to as switches, unless explicitly stated otherwise. Each 2×2 switch has two lines for receiving established call request/call set-up request/asynchronous data request packets, labeled as d-in 1 and d-in 2, and two lines for forwarding the received packets to the next stage of the network, labeled d - out1 and d - out2 respectively. There are two acknowledge input lines, one at each output of the sub-switch and two acknowledge output lines, one at each sub-switch input. A combination of a data and an acknowledge line is referred to as a switch port. A packet received on a packet input line (D-IN1 or D-IN2) is forwarded to one of the two packet output lines (D-OUT1 or D-OUT2). The choice of the packet output line is based on the destination address of the packet, which is included in the packet. If two packets arriving on the two input lines require the same output line, one of them is selected. Details of the arbitration method are discussed later.

The acknowledge lines are used to inform each network input whether the packet submitted on that network input was successfully transmitted to the intended network output. The ack-in lines indicate that a packet forwarded on an output line of the subswitch was successfully forwarded by the subsequent stages also. The ack-out lines indicate that a packet accepted by the sub-switch from an input line has been transmitted by this stage and the subsequent stages successfully till the network output.

Figures 5, 5A:
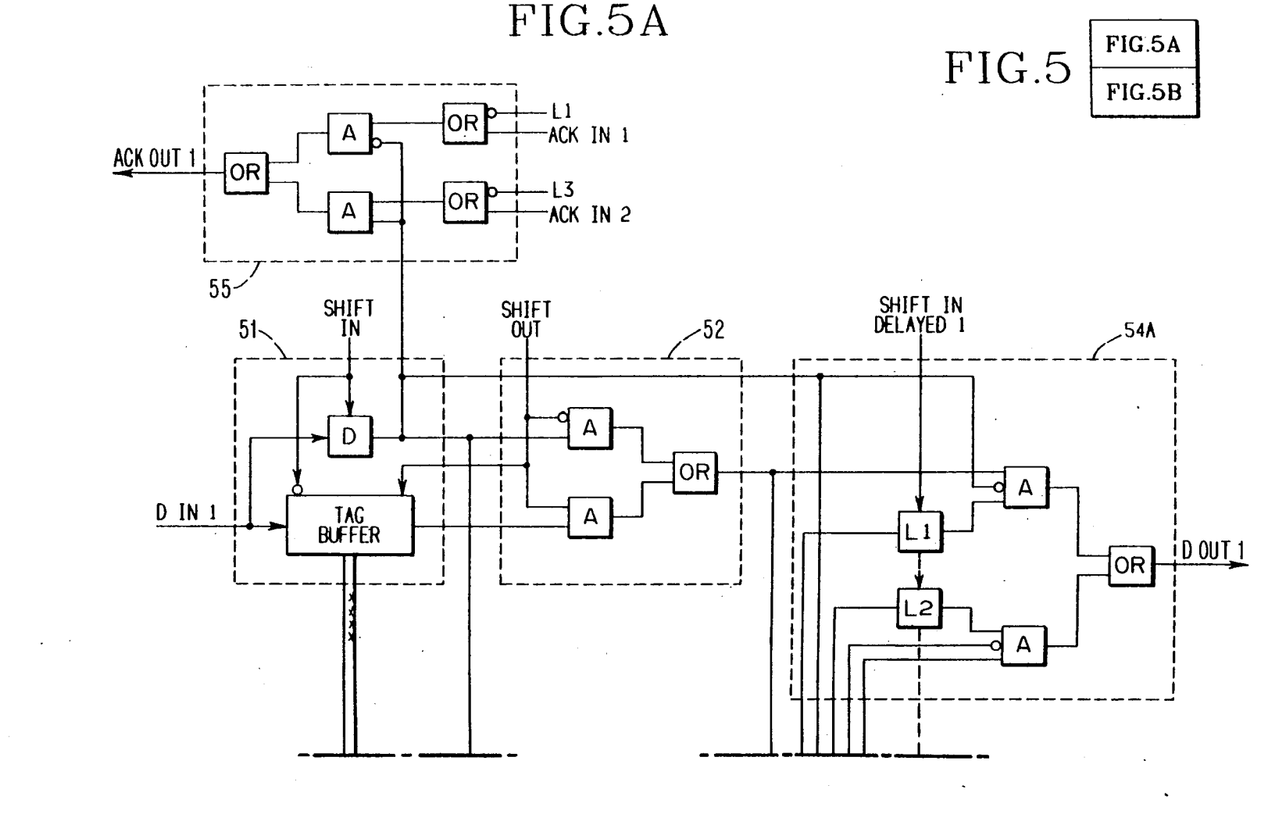
FIGS. 5, 5A and 5B are more detailed schematic of a subswitch used in the shuffle exchange network.
Figure 5B:
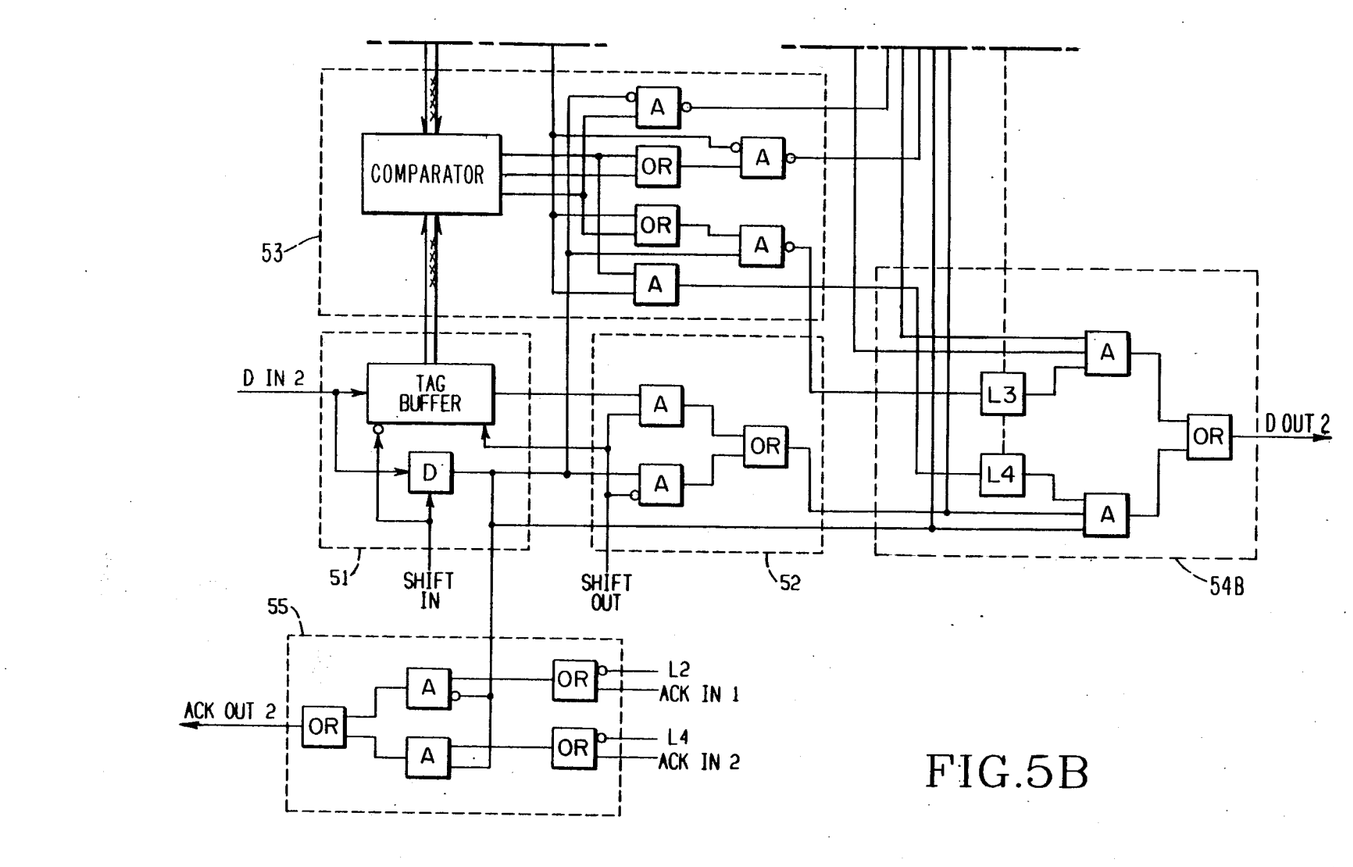

Referring to FIG. 5, the subswitch 20 consists of the following sub-units: the input buffer unit 51, the message re-format units 52, the arbitration unit 53, acknowledgement units 55, and the output units 54A and 54B. The input buffer unit extracts the tag and one bit (the control bit) from the address of the packet. There are two copies of this unit, one for each input port. The message re-format unit rotates the address bits in the packet. The leading bit in the address of the packet is made the trailing bit and all other bits are moved up by one bit. When the packet exits the network the address bits are in the same order in which they entered the network. As a result of this rotation, the switches in all stages of the network can perform arbitration on the leading bit in the address field of the packet. There are two copies of this unit also, one for each input. The arbitration unit resolves the contention by two packets for the same output, and assigns an output port to one of the incoming packets. The output unit forwards the packet selected by the arbitration unit to the output link. There are two copies of this unit, one for each output link.

Again referring to FIG. 5, each of the sub-units of the switch are further described below. The rectangular boxes in this figure with the letters A, OR and D inside symbolize AND gates, OR gates and D flip-flops, respectively.

Input Buffer Unit 51

The input buffer unit contains an n-bit shift register to capture the priority bits (tag portion) of the packet and a flip-flop to capture the control bit from the destination address. The tag bits are the first n bits of the packet and the control bit is the $n+1$st bit. A shift signal is generated to accomplish this task. The priority bits are available in the tag register after n bits of the packet are received. The $n+1$ bit is captured in the flip-flop. At the end of this bit cycle, the output arbitration is complete (as detailed below) and the remaining bits of the address and the data following it are streamed into and out of the tag register. The information is read out from the tag register using a shift-out signal.

Message Reformat Circuit 52

This circuit combines the bits arriving from the tag register with one bit from the D-flip-flop (holding the control bit). The message if formed by taking the $n+a-1$ bits (where there are a-bits of address) from the tag register, the $n+a^{th}$ bit from the D-flip-flop and the remaining $M-(n+a)$ bits from the tag register again. As a result the address bits of the message are right rotated by one bit. Also, the message is delayed by $n+1$ clock cycles in going through the input buffer unit and message reformat unit (where n is the number of bits in the priority tag).

Arbitration Unit 53

The function of the arbitration unit is to select one of two packets that need to be transmitted to the same output link in the same slot. The priority is encoded in a manner so that if the priority bits are interpreted as n-bit unsigned integers, higher priority corresponds to a smaller number. The arbiter inhibits the transmission of a packet from an input port to the desired output port if the packet arriving at the other input port needs the same output port and has a higher priority. If packets arriving on the two input ports have the same priority and they request the same output port, the packet arriving on the upper input is transmitted if the output port in contention is the upper output port while the packet arriving on the lower input port is selected if the output port in contention is the lower one. The implementation is only one of many possible methods of arbitrating between packets of the same priority directed to the same output port. Those skilled in the art will appreciate that this implementation may be readily adapted to different arbitration policies, for instance, a round robin priority.

The arbitration unit 53 reads the tag registers and the D-flip-flops from the two input buffer units. The tags (i.e., priority) are compared and using the output of the D-flip-flops and the comparator, four inhibit signals are generated. This operation is performed when $n+1$ bits of the packet have been captured and the signals are latched in flip-flops L1–L4 while the $n+2^{nd}$ bit is captured. L1 is set if the packet from the upper input has to be transmitted on the upper output. L3 is set if the packet on the upper input is selected for transmission on the lower output L2 and L4 are used for the lower input similarly.

Output Section

The two output units 54A and 54B (one for each output of the switch) are essentially selectors which select the packet from one of the two inputs of the switch, depending on the states of the latches L1–L4.

Acknowledge Unit 55

There are two copies of this unit, one for each input port. A negative acknowledge signal must be generated for an input port if the packet received on that input port could not be forwarded either due to contention within the switch or contention at the subsequent stages. A packet arriving at the upper input port will be blocked if (a) it requests the upper output and either L1 is clear or a negative acknowledgment is received from the upper output port, or (b) it requests the lower output port and either L3 is clear or a negative acknowledge is received on the acknowledge input of the lower output port. The conditions for blockage of a packet arriving on the lower input port are analogous. It is the circuit shown in FIG. 6 that generates the desired acknowledge out signals.

The output port adapter (terminating adapter) (see 801–808 of FIG. 1) receives packets from the last stage of the network and forwards it to an output interface module. The output port adapter carries out no higher level protocol; it merely forwards the packet along with the slot number. Data within the packet is used by the output interface module to interpret the packet and provide the desired service. Higher level protocols between the input and output interface modules may be used for this purpose.

Shown in FIG. 6 is a schematic illustration of the three types of packets that are switched in accordance with the method of this invention.

The established call request packet 61 is used to continue a call that has already been established by a circuit connection through the multi-stage interconnection network 10. The term "call" usually refers to a voice connection through the MIN, but it will also refer to any request for synchronous data transmission. The priority level, see 64, of the established call request packet is 00, and this level is the highest assignable priority level. This level can be assigned to a packet only after a corresponding packet of the second highest priority level for the same circuit connection was successfully transmitted through all stages of the multi-stage interconnection network. That is, only after a packet was successfully transmitted from a corresponding input (see for example, 201 of FIG. 2), of a sub-switch (see 20 of FIG. 2) of the first stage (see FIG. 2) of the switching network 10 to a corresponding output (see 603 of FIG. 2) of a subswitch of the last stage of the switching network.

The call set up request packet 62 is used to set up a new call, such as a telephone call, or to originate a new circuit connection through the multistage interconnection network for synchronous data. The circuit connection for a call is then a path through the multi-stage interconnection network in corresponding slots of a sequence of frames to, for example, have a telephone conversation pass through the network. The circuit connection could also be used to transmit data if so desired. The priority level, see 65, of the call set-up request is 01, the second highest priority level in this embodiment. Once the circuit connection is established and the call set up request packet is transmitted therethrough in the given time slot (see 75 of FIG. 7), corresponding established call request packets 61 are sent through the circuit connection in corresponding slots 75 of subsequent frames 70.

The asynchronous data request packet 63 is used to request transmission of data in available time slots of the frames. Again, data as used in this application refers to asynchronous data unless otherwise specified. The priority level, see 66, of this packet is 10, the third highest priority level. Since this asynchronous data packet is for asynchronous data transmission, only available time slots, and not corresponding time slots, in the frames need be used.

The bits to the left of the priority level are the address bits of the packet which corresponding to a particular output of a subswitch of the final stage of the multistage interconnection network. For the address bits, see 67, 68, and 69 of FIG. 6. Finally, in the space to the left of the address and priority level bits, is the call information (voice information) or data to be transmitted.

It is also possible to use another sequence of priority levels or even more priority levels without departing from the scope of this invention.

Shown in FIG. 7 is a plurality of frames 70A, 70B and 70C, including slots 75 therein. These frames represent specific time intervals and the slots represent further subdivisions of these frames. The multi-stage interconnection network is operated in frames. At a port adapter, a used slot will correspond to an established circuit connection (circuit switched connection). Unused slots are available for new circuits and then for asynchronous data request packets. In each slot a port adapter may make a request to transmit a packet to a terminating adapter. If the request is for synchronous transmission, corresponding slots of subsequent frames must be used for the same circuit connection. In each slot all the input adapters may make a request for a circuit connection. The term circuit connection shall just refer to a connection from an originating adapter (also referred to as an input adapter) to a terminating adapter (also referred to as an output adapter) for sending synchronous data in corresponding time slots of a sequence of frames. The term "data", unless otherwise specified as in "synchronous data", shall refer to asynchronous data.

Voice Switching

It will be assumed that the voice source are Pulse Code Modulated (PCM) at 64 Kbps and that a voice sample delay of about 5 msec in the switch is acceptable. To satisfy this delay requirement, a frame time of 5 msec is chosen. In .5 msec, each voice source at 64 Kbps accumulates 40 bytes worth of voice samples. Two bytes of routing and priority information are required for routing these voice samples in a 128×128 shuffle exchange network. An upper bound on additional control information for routing outside the switch is assumed to be 4 bytes. This grouping of 40 bytes of sample data and 4 bytes of control information will be referred to as a voice packet. This does not include the control information for routing within the shuffle exchange switch.

The network will be operated in synchronous mode. In each slot, input port adapters make requests to establish a voice circuit (priority 01) or send voice information packets for an established call (prioirty 00). A conservative estimate of time for the network to process the port requests and acknowledge successful ports is about 0.5 usec for a 1K×1K shuffle exchange network. The rate of data transmission for an acknowledged request can be designed at 100 Mbps for serial data transmission. At this rate, the time to transmit 44 bytes of data is 3.52 usec. Thus, including network set-up, a slot time of 4 usec is a conservative estimate. This implies 1250 slots can be packed in each frame.

The switch settings in the network change in every slot. Setting up all the switches (896 switches for a 128×128 network) in 4 usec using a centralized controller is a formidable task. In addition, such a centralized controller would have to store the settings for each slot in a frame requiring a very large and fast memory. Therefore, the distributed and dynamic approach described here for controlling the network is attractive and practical.

The shuffle-exchange network is blocking. Hence, for reasonable performance, a port cannot use all the slots. The following paragraphs provide an approximate estimate of the probability of a new call request being blocked, given a number of established calls per adapter.

For this example, a 128×128 network will be considered. Suppose that the expected number of established calls per adapter is C. Assuming that the calls are equiprobably distributed across the slots in the frame, each adapter has C calls and in each slot C*128/1250 circuits are established in the network. Since C*128/1250 circuits go through each stage of the network, the probability that (new) call set-up packet gets blocked in a particular stage is approximately 0.5*C/1250 or C/2500. Therefore, the probability that a packet is not blocked in any stage in any particular slot is $$1-(1-C/2500)^7$$

Since 1250-C slots are free at each adapter and a call is blocked only if it is blocked in each slot of a frame, the probability of a call being blocked is approximately $$B(C)=[1-(1-C/2500)^7]^{1250-C}$$

Figure 8:
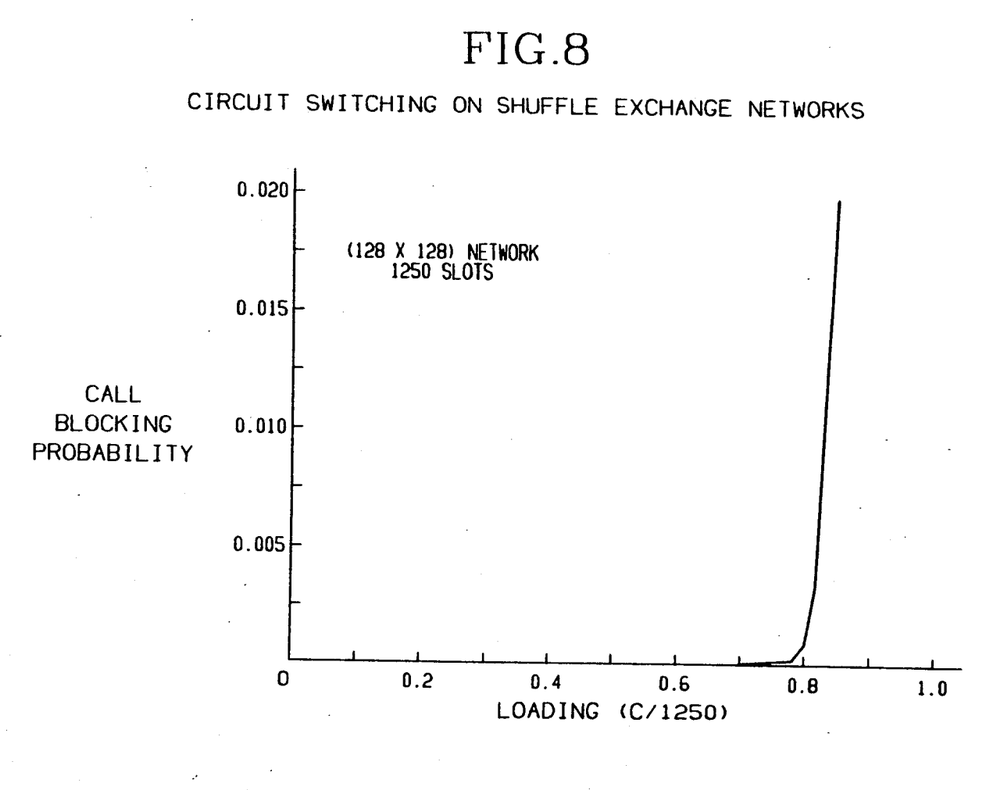
FIG. 8 is a graph showing call blocking probability as a function of loading for $128 \times 128$ shuffle exchange network using the method of this invention.

FIG. 8 shows the (new) call blocking probability as a function of the loading, C/1250. This graph shows that at 80% loading, the call blocking probability is about 0.00083 or less than 0.1%. This corresponds to 1000 calls per port or 128000 calls through the switch. (The number of subscribers that can be supported at this blocking probability at 6 ccs per subscriber is about three times this number.) Further, the rest of the available slots can be used for lower priority data traffic, such as file transfer traffic, as described in the next section.

Integrated Voice-Data

To accommodate data traffic a third priority level of 10 is introduced. A buffer for data (non-voice) traffic will be provided in each port adapter. In each slot which is not used by a voice packet, and in which the adapter is not trying to establish a voice circuit, a data packet request is placed on the network. Since the data packet has lowest priority, it will not block established voice calls or voice call set-up requests. If a data packet request gets blocked in the network due to collision with other packets, another request will be made in an available slot until the packet gets through.

In the above mode of operation, it is quite possible for the data sources to be starved of network bandwidth if no controls are placed on the voice traffic. This situation can be remedied by bounding the number of voice calls that can be made at an adapter at any time instant. For instance, voice may be allowed to use up to 70% of the available slots, or 875 simultaneous conversations per port in the above example. At this usage level the voice blocking probability is absolutely negligible (about $0.65 \times 10^{-8}$). Note however, that for small voice blocking probability it is important that slots should not be reserved for data, but rather that the number of voice calls per port be limited. The reason is that if data slots are reserved then the number of available voice slots is reduced; for maximum blocking probability of 0.1% about 77% of the available voice slots (674 in the above example) can be used.

Having thus described our invention, what we claim as new, and desire by Letters Patent is:

1. A method of switching packets through a multistage interconnection switching network, comprising the steps of:
   (a) assigning a packet, for a circuit connection, the highest assignable priority level only after a corresponding packet, for the circuit connection, with the second highest assignable priority level, was successfully transmitted from a corresponding input of a subswitch of the first stage of the switching network to a corresponding output of a subswitch of the last stage of the switching network;
   (b) transmitting each packet at the input of each subswitch of the first stage of the switching network to an output of the same corresponding subswitch, which output is indicated by a respective address bit in the respective packet, a given packet being transmitted as provided for in this step of this claim, only if no other packet, at the same corresponding subswitch, requests the same output of the subswitch;
   (c) transmitting the packet with the highest priority level of all the packets at the inputs of each subswitch of the first stage of the switching network to the output of the same corresponding subswitch, which output is indicated by the respective address bit in the respective packet being transmitted, a given packet being transmitted as provided for in this step of this claim only if other packets at the same corresponding subswitch with different priority levels request the same output of the corresponding subswitch;
   (d) transmitting, for each subswitch of the first stage of the switching network, any one, of a number of packets transmitted to the inputs of the respective subswitch of the first stage of the switching network, to the output of the respective subswitch indicated by a respective address bit in the one packet, if the number of packets are of the same priority level and request the same output of the respective subswitch; and
   (e) repeating steps b, c, and d for packets at inputs of subswitches of subsequent stages of the switching network until the packets reach respective outputs of subswitches of the last stage of the network, the outputs of the respective subswitches of any of the subsequent stages being requested by respective subsequent address bits in the respective packets so that packets are transmitted from the inputs of the subswitches of the first stage of the multistage interconnection network to the respective outputs of the last stage of the interconnection network.

2. A method as recited in claim 1, wherein only synchronous data packets are assigned the highest assignable priority level.

3. A method as recited in claim 1, further comprising the steps of:
   (a) storing a packet in each originating adapter having a request at its input to send a packet which has therein a priority level and an address corresponding to a terminating adapter, each originating adapter being connected to an input of a subswitch of the first stage of the switching network;
   (b) comparing within a given time slot the priority levels of a number of packets stored in each originating adapter; and
   (c) transmitting, from each adapter, within the given time slot, the packet with the highest priority level in each originating adapter to the output of each respective adapter, each output being connected to a particular subswitch input of the first stage of the switching network.

4. A method as recited in claim 3, further comprising the steps of:
   removing from the storage of each of the originating adapters, the packets that were successfully transmitted from the respective originating adapter to the respective output of a subswitch of the last stage of the switching network.

5. A method as recited in claim 1, wherein the multistage interconnection switching network is a digital shuffle exchange network.

6. A method as recited in claim 1, wherein there are four or more priority levels which a packet can have.

7. A method as recited in claim 1, wherein the second highest assignable priority level is assigned to a packet which has a request to set up a circuit connection for sending synchronous data.

8. A method as recited in claim 7, wherein the synchronous data is voice data.

9. A method of integrally switching packets of synchronous and asynchronous data from a plurality of inputs of originating adapters to a plurality of outputs of terminating adapters over a multistage interconnection switching network with distributed control, the paths of the network from the originating adapters to the terminating adapters changing at most once in every time slot, with a number of the paths being repeated in corresponding time slots of subsequent frames, the method comprising the steps of:
   (a) assigning a packet, for a circuit connection, the highest assignable priority level only after a packet, for the circuit connection, with the second highest assignable priority level was successfully transmitted from a corresponding originating adapter to a corresponding terminating adapter, the circuit connection being established in each time slot of corresponding time slots of a number of frames;
   (b) storing a packet in each of the originating adapters having a request at its input to send a packet which has therein a priority level and an address corresponding to one of the terminating adapters, the priority level being any one of a plurality of levels;

(c) comparing within a given time slot the priority levels of a number of packets stored in each of the originating adapters;

(d) transmitting from each adapter within the given time slot, the packet with the highest priority level in each of the originating adapters to the output of each adapter, each output of each adapter being connected to a particular subswitch input of the first stage of the switching network;

(e) transmitting each packet, transmitted to a respective subswitch input of the first stage of the switching network, to a respective subswitch output indicated by the first address bit in each respective packet, a given packet being transmitted as provided for in this step of this claim only if other packets at the same corresponding subswitch with different priority levels request the same output of the corresponding subswitch;

(f) transmitting, for each subswitch, the packet, with the highest priority level of the packets transmitted to the inputs of the respective subswitch of the first stage of the switching network, to the output of the respective subswitch indicated by the first address bit in that packet, a given packet being transmitted as provided for in this step of this claim only if other packets at the same corresponding subswitch with different priority levels request the same output of the corresponding subswitch;

(g) transmitting, for each subswitch of the first stage of the switching network any one, of a number of packets transmitted to the inputs of the respective subswitch of the first stage of the switching network, to the output of the respective subswitch indicated by the first address bit in the one packet, if the number of packets are of the same priority level and request the same output of the respective subswitch;

(h) repeating steps e, f, and g for packets at inputs of subswitches of subsequent stages of the switching network until the packets reach respective outputs of subswitches of the last stage of the network, which outputs, of the last stage, are connected to the inputs of the terminating adapters, the outputs of the respective subswitches of any of the subsequent stages being requested by respective subsequent address bits in the respective packets so that a packet is transmitted from the originating adapter to corresponding terminating adapters within the given time slot of step (c); and (i) removing from the storage of each of the originating adapters the packets that were acknowledged to have been successfully transmitted to a respective terminating adapter.

10. A method of integrally switching packets of synchronous and asynchronous data from a plurality of inputs or originating adapters to a plurality of outputs of terminating adapters over a digital shuffle exchange network, comprising the steps of:

(a) storing an established call request packet, with a highest priority level and an address corresponding to one of the terminating adapters, in each of the originating adapters having a request at its input to continue a call that has been set up;

(b) storing a call set up request packet in a pending call set up request queue in each of the originating adapters having a request at its input to establish a new call, the call set up request packet having a second priority level lower than that of the highest priority level, and having an address corresponding to one of the terminating adapters;

(c) storing an asynchronous data request packet with an asynchronous data request in a data buffer in each of the originating adapters having a request at its input to send asynchronous data, the asynchronous data packet having a third priority level lower than that of the second priority level and having an address corresponding to one of the terminating adapters;

(d) comparing within a given time slot, the priority levels of a number of packets stored in each of the originating adapters, with one of the number being at the head of the pending call set up request queue if there are such requests in the queue, another of the number being from the data buffer if there are packets in the buffer, and a third of the number being an established call request packet if there is an established call request packet to be transmitted in the given time slot;

(e) transmitting from each adapter, within the given time slot, the packet of step (d) with the highest priority in each of the originating adapters, the respective packet being transmitted to the input of a subswitch of the first stage of the shuffle exchange network, a respective call set up request packet being transmitted only if the slot at the time time for transmission of the call set up request packet has not been allocated for accepting only call set-up request packets;

(f) transmitting each packet at the input of each subswitch of the first stage of the switching network to an output of the same corresponding subswitch, which output is indicated by a respective address bit in the respective packet, a given packet being transmitted as provided for in this step of this claim only if no other packet, at the same corresponding subswitch, requests the same output of the subswitch;

(g) transmitting the packet with the highest priority level of all the packets at the inputs of each subswitch of the first stage of the switching network to the output of the same corresponding subswitch, which output is indicated by the respective address bit in the respective packet being transmitted, a given packet being transmitted as provided for in this step of this claim only if other packets at the same corresponding subswitch with different priority levels request the same output of the corresponding subswitch;

(h) transmitting, for each subswitch of the first stage of the switching network, any one, of a number of packets transmitted to the inputs of the respective subswitch of the first stage of the switching network, to the output of the respective subswitch indicated by a respective address bit in the one packet, if the number of packets are of the same priority level and request the same output of the respective subswitch; and (i) repeating steps b, c, and d for packets at inputs of subswitches of subsequent stages of the switching network until the packets reach respective outputs of subswitches of the last stage of the network, the outputs of the respective subswitches of any of the subsequent stages being requested by respective subsequent address bits in the respective packets so that packets are transmitted from the inputs of the subswitches of the first stage of the multistage interconnection network to the respective outputs of the last stage of the interconnection network;

(j) transmitting a positive acknowledgement to each of the originating adapters from which a packet was successfully transmitted to a respective adapter of the terminating adapters as in step (i); and (k) removing, from the storage of each of the originating adapters, the packets that were acknowledged to have been successfully transmitted as in step (j).

11. A method as received in claim 10, wherein the percentage, of the the total slot positions of each frame that are allocated to established call request packets, is bounded by a fixed number.

12. A method as recited in claim 10, wherein the granularity of the network is a packet.

13. A method as recited in claim 10, wherein the individual sub-switches of the shuffle exchange network are opened or closed during a period of one time slot to provide conductive path from each of the originating adapters to respective terminating adapters corresponding to the address in the packets to be transmitted in the time slot.

* * * * *